W. L. McCARTY.
BALE IDENTIFYING MEANS.
APPLICATION FILED OCT. 17, 1907.

929,691.

Patented Aug. 3, 1909.

Witnesses

Wreford L. McCarty. Inventor

By C. A. Snow & Co.
Attorneys

UNITED STATES PATENT OFFICE.

WREFORD L. McCARTY, OF MEMPHIS, TENNESSEE.

BALE-IDENTIFYING MEANS.

No. 929,691.  Specification of Letters Patent.  Patented Aug. 3, 1909.

Application filed October 17, 1907. Serial No. 397,924.

*To all whom it may concern:*

Be it known that I, WREFORD L. McCARTY, a citizen of the United States, residing at Memphis, in the county of Shelby and State of Tennessee, have invented a new and useful Bale-Identifying Means, of which the following is a specification.

The principal object of the present invention is to provide an improved means for identifying bales of cotton or other material.

In the handling of bales of cotton, hay, straw and other material, it is found difficult to provide means for properly identifying the bales. In the majority of cases small tags bearing the identifying marks are attached to the bales as they come from the press, but through careless handling during storage and transportation these tags frequently become detached or mutilated to such an extent as to render identification impossible.

The object in the present case is to provide a bale identifying means in the form of a long or practically continuous strip of textile or other material on which the identifying marks are printed or stamped at frequent intervals, the strip being preferably of the same length as the bale, and being bound in by all of the bale ties, wires, or bands, so that it is practically impossible to accidentally destroy or mutilate all of the identifying marks and at least one or more of such marks will remain in good condition, so that the bale may be traced from the compress to the user.

Figure 1:
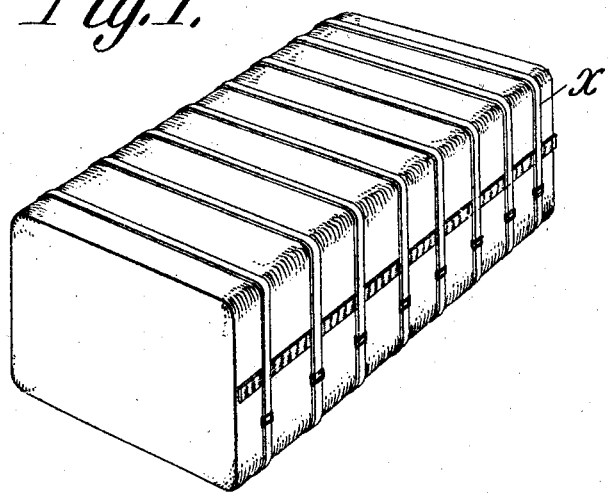
Figure 2:
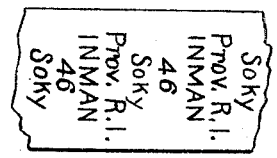

In the accompanying drawings:—Figure 1 is a perspective view of a bale of cotton or other material provided with an identifying strip in accordance with the invention. Fig. 2 is a detail view of a portion of the strip on an enlarged scale.

In carrying out the invention, a long and continuous strip of textile or other material is printed or stamped with identifying marks repeated at frequent intervals and this may be accomplished by running the strip through a suitable revolving press or stamp. The identifying marks may be of any character, but preferably are such as to show the point of origin, the name of the shipper, the mark of the cotton and the destination. In practice the strip is usually about sixty inches in length and these marks are repeated some thirty times at equi-distant intervals. The strip is held against the side of the bale during or immediately after the completion of the compressing operation and before the ends of the bale bands or ties $x$ are connected. The ends of the ties are then brought together and united in the usual manner, so that the identifying strip is bound in by every one of the ties, and owing to the number of identifying marks, it is practically impossible to destroy or deface all of them in such manner as to render the identification impossible.

I claim:—

1. A bale having spaced encircling bands, and a bale identifying means comprising a strip bearing identifying marks repeated at intervals throughout its length, said strip being bound by the bale bands.

2. A bale having encircling bands, and a bale identifying means comprising a strip disposed between the bale and bands and transversely of the latter and engaged by a plurality of the same, said strip being provided with a plurality of identifying marks repeated at short intervals throughout its length.

3. A bale, a bale identifying strip disposed longitudinally of the bale, and bale bands encircling the bale and strip at intervals and binding them together, said bands engaging the strip at intervals and the strip being provided at intervals with a plurality of bale identifying means.

In testimony that I claim the foregoing as my own, I have hereto affixed my signature in the presence of two witnesses.

WREFORD L. McCARTY.

Witnesses:
J. ROSS COLHOUN,
JAS. M. WALKER.